United States Patent [19]
Ohkubo et al.

[11] Patent Number: 5,372,321
[45] Date of Patent: Dec. 13, 1994

[54] TAPE TRANSPORT APPARATUS HAVING PULLEY AND PULLEY DRIVE MOTOR PROVIDED TO THE SAME BASE AND MOVE TOGETHER

[75] Inventors: Hiroshi Ohkubo, Fussa; Takashi Miyamoto, Tokyo; Yoh Kamei, Kokubunji, all of Japan

[73] Assignee: Teac Corporation, Tokyo, Japan

[21] Appl. No.: 180,764

[22] Filed: Jan. 6, 1994

Related U.S. Application Data

[63] Continuation of Ser. No. 58,804, May 6, 1993, abandoned, which is a continuation of Ser. No. 797,405, Nov. 25, 1991, abandoned.

[30] Foreign Application Priority Data

Nov. 26, 1990 [JP] Japan ............... 2-123758[U]
Oct. 16, 1991 [JP] Japan ............... 3-084036[U]

[51] Int. Cl.⁵ ........................................... G11B 15/32
[52] U.S. Cl. ..................................... 242/340; 242/342; 242/352.4; 226/181; 226/187; 226/188; 226/194
[58] Field of Search ............ 226/188, 181, 187, 194; 242/200, 206, 207, 208, 209

[56] References Cited

U.S. PATENT DOCUMENTS

| | | | |
|---|---|---|---|
| 3,373,951 | 3/1968 | Mazoyer | 226/188 |
| 3,851,842 | 12/1974 | Bastiaans | 242/199 |
| 4,189,079 | 2/1980 | Uehara | 226/188 |
| 4,283,027 | 8/1981 | Naito | 242/208 |
| 4,739,951 | 4/1988 | Zeavin | 242/209 |

FOREIGN PATENT DOCUMENTS 2-68333 5/1990 Japan.
2-49639 5/1991 Japan.
3-66053 6/1991 Japan.

Primary Examiner—Daniel P. Stodola
Assistant Examiner—John P. Darling
Attorney, Agent, or Firm—Michael N. Meller

[57] ABSTRACT

A tape transport apparatus configuration with a mounting portion, a single moving base, a motor, a pulley, and an urging mechanism. The mounting portion mounts a cartridge having an externally driven roller, and an information recording tape that runs in accordance with a rotational force of the roller. The moving base that has the motor is provided to the side of the roller, in the cartridge mounted to the mounting portion. The pulley is provided to the moving base and is rotationally driven in accordance with rotation of the motor. The urging mechanism acts on the moving base so that the pulley is brought into contact with the roller in the cartridge mounted to the mounting portion, and is pressed against the roller.

9 Claims, 7 Drawing Sheets

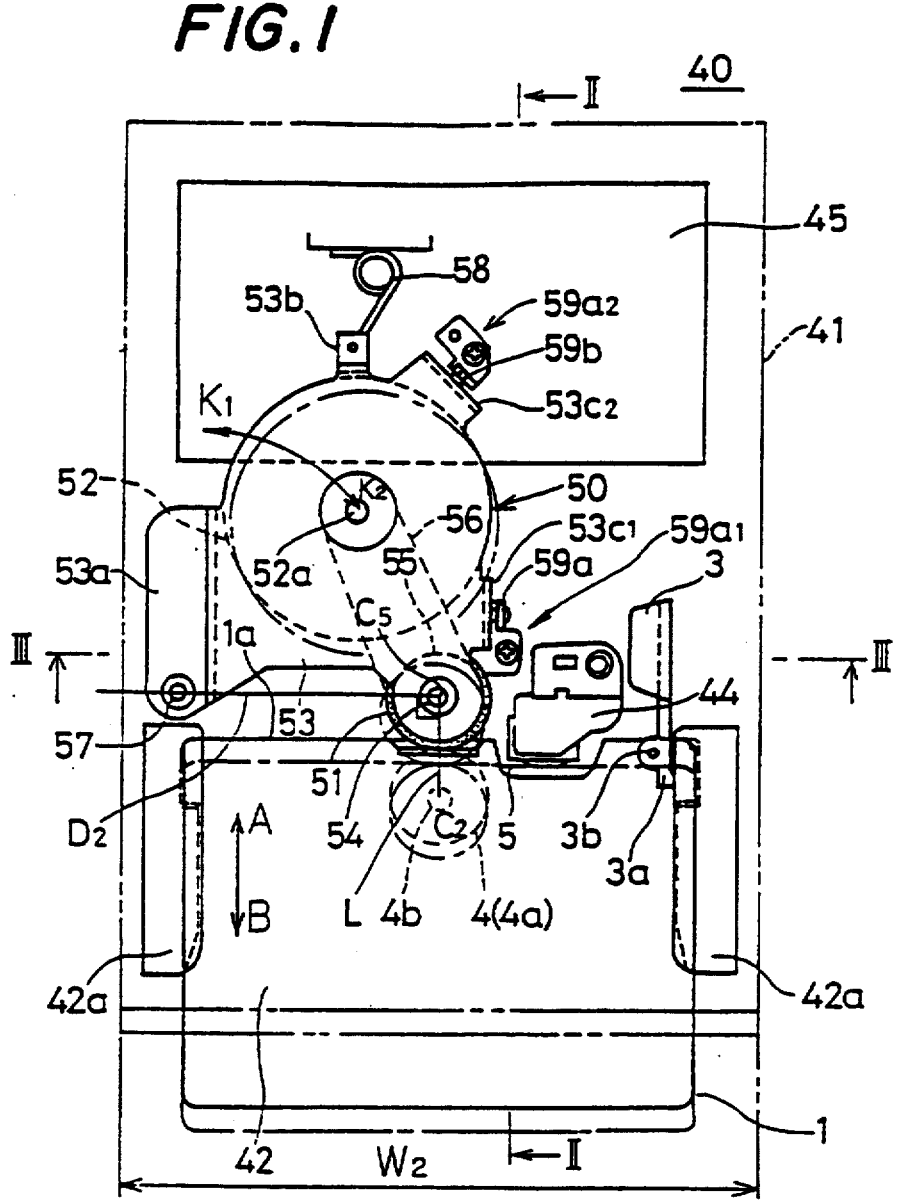
FIG. I
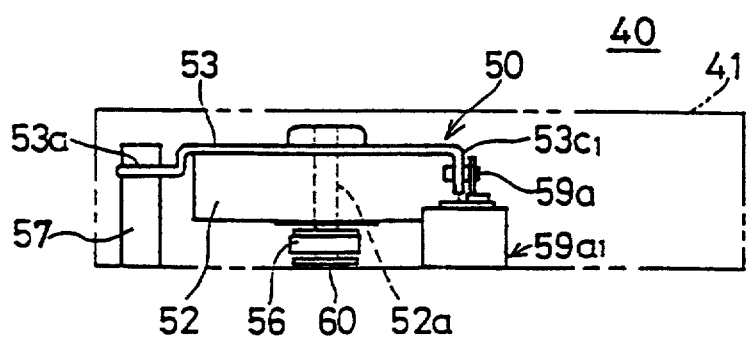
FIG. 3

TAPE TRANSPORT APPARATUS HAVING PULLEY AND PULLEY DRIVE MOTOR PROVIDED TO THE SAME BASE AND MOVE TOGETHER

This application is a continuation of application Ser. No. 08/058,804, filed May 6, 1993, now abandoned, which is a continuation of application Ser. No. 07/797,405, filed Nov. 25, 1991, now abandoned.

BACKGROUND OF THE INVENTION

The present invention relates to a tape transport apparatus with a reduced widths which apparatus is used with a cartridge having an internal drive roller. More particularly, the invention relates to a tape transport apparatus in which a pulley and pulley drive motor are mounted to the same base.

In tape recorders, data recorders, and other conversational devices using cartridges which store information recording tapes (magnetic tapes and the like), the tape transport apparatus causes the information recording tape to run. For example, the information recording tape is mounted onto reels inside the cartridge and the tape transport apparatus rotationally drives the reels from outside the cartridge so that the information recording tape runs, and the recording of information to and/or playback from the information recording tape (hereinafter termed magnetic tape) is performed.

FIG. 6 is a perspective view showing an outer view of a data cartridge. Internal to the data cartridge 1 is a drive roller 4. This is rotationally driven from outside so that the tape inside the cartridge runs.

As shown in FIG. 6, a window opening 2a is formed on the center portion at an intersection of a side and a front surface of a case 2. To the left side of the front surface of the case 2 is provided a cover 3 adjacent to the window opening 2a. The drive roller 4 is provided internal to the case 2, and the peripheral surface 4a of the drive roller 4 is exposed from the window opening 2a. The cover 3 is supported by the corner of the left side of the front surface of the case 2 and is freely rotatable.

The cover 3 is normally closed in order to prevent entry of dust into the case 2. When the distal end portion 3a of the cover 3 is pressed, the cover 3 rotates about the center of a support shaft 3b shown in FIG. 7 and opens. Then, a magnetic tape (not shown in the figure) stored inside the case 2 is exposed from the opening portion and the exposed magnetic tape comes into contact with a magnetic head not shown in FIG. 7.

FIG. 7 is a plan view showing the internal configuration of the data cartridge. Inside the case 2 of the data cartridge 1 are provided a pair of reels 6 and 7, a pair of guide rollers 8 and 9, a pair of tension rollers 10 and 11 and the drive roller 4. The respective reels and rollers are supported on shafts so as to be freely rotatable.

A drive belt 12 is mounted on the drive roller 4, and the guide rollers 8 and 9. This drive belt 12 presses against the front surfaces of magnetic tape reels 5a and 5b wound around the reels 6 and 7.

In the data cartridge 1 with the above described structure, external rotational force is transmitted to the drive roller 4, and rotation of the drive roller 4 makes a magnetic tape 5 run inside the case 2 as described below.

More specifically, when the drive roller 4 rotates clockwise, the drive belt 12 moves in the direction shown by the arrow E. Hence, the forces F1 and F2 in the direction of the line of contact are applied to the peripheral portion of the magnetic tape reels 5a and 5b that are wound to the reels 6 and 7.

As a result, reels 6 and 7 both rotate counter-clockwise, and the magnetic tape 5 is wound from the reel 6 to the other reel 7. The magnetic tape 5 runs in the direction shown by the arrow D, between the tension rollers 10 and 11. When this occurs, the magnetic tape 5 does not contact the drive belt 12 that is wound to the drive roller 4.

FIG. 8 is a plan view showing one example of a conventional tape transport apparatus. FIG. 9 is a sectional view along the sectional line VIII—VIII of FIG. 8. In both figures, the state where the data cartridge 1 is mounted is shown by a solid line, and, in FIG. 8, the state where the data cartridge 1 is partially mounted is shown by a broken line.

As shown in both of these figures, a tape transport mechanism 20 has a circuit board 25, a magnetic head 24, a drive unit 30, and a mounting portion 22 inside a transport apparatus main unit 21. The data cartridge 1 is inserted to or withdrawn from the mounting portion 22, in a direction, as shown by the arrow A-B from outside the transport apparatus main unit 21.

The magnetic head 24 comes into contact with the magnetic tape 5 inside the data cartridge 1 and the recording of information to and/or playback from the information recording tape is performed. To the magnetic head 24 are supplied recording signals from the circuit board 25 and the reproduction signals from the magnetic head 24 are output to the circuit board 25 and processed.

The drive unit 30 has a pulley 31. This pulley 31 contacts the drive roller 4 of the data cartridge 1 and rotates, causing the drive roller 4 to also rotate. In FIG. 9, above this pulley 31 is provided a roller 32 which is on the same shaft as the pulley 31. The pulley 31 and the roller 32 are supported by a rotating shaft 33 supported by a support member 38 and are freely rotatable.

A roller 35 is inserted into a rotating shaft 34a of a drive motor 34 and is fixed. A belt 36 is wound to the roller 35 and the roller 32. The rotational force of the drive motor 34 is thus transmitted to the pulley 31 via the roller 35, the belt 36 and the roller 32.

The support member 38 is supported by a rotating shaft 37 and the rotating shaft 37 is provided on the transport apparatus main unit 21. Accordingly, the support member 38 is freely rotatable with respect to the transport apparatus main unit 21. Between the support member 38 and the transport apparatus main unit 21 is provided a spring (not shown in the figure). In FIG. 8, the support member 38 is urged by the spring force of this spring so that it rotates in the direction P2.

Accordingly, when the data cartridge 1 is not mounted, the pulley 31 is at the position shown by the dotted line in FIG. 8. When the data cartridge 1 is partially mounted, the drive roller 4 comes into contact with the pulley 31 and opposes the spring force so that the pulley 31 is pressed in the upwards direction in FIG. 8. As a result the pulley 31 rotates along with the support member 38 in the direction P1, and when the mounting of the data cartridge 1 is completed, the pulley 31 is in the position shown by the solid line in FIG. 8.

As has already been explained, the pulley 31 is urged, along with the support member 38, so that it rotates in the direction P2, and so when the data cartridge 1 is mounted in the mounting portion 22, the pulley 31 comes into contact with the peripheral surface 4a of the drive roller 4 and the drive roller 4 is pressed in the downwards direction in FIG. 8.

When the drive motor 34 rotates under the conditions described above, the pulley 31 rotates via the belt 36, and the drive roller 4 rotates so that the magnetic tape 5 inside the data cartridge 1 runs. When rotation of the drive motor 34 stops, the rotation of the pulley 31 stops, the rotation of drive roller 4 stops and the running of the magnetic tape 5 stops.

The tape transport mechanism 20 that includes the drive unit 30 described above must have the following conditions satisfied so that the rotational force of the drive motor 34 is efficiently transmitted to the drive roller 4 inside the data cartridge 1 in order to make the magnetic tape 5 run.

First, smooth transmition of the rotational force of the drive motor 34 to the pulley 31 via the belt 36 requires that there be no slipping of the belt 36 with respect to the pulley 31 and the roller 35. Accordingly, in the mounted state of the data cartridge 1, the tensile force that acts on the belt 36 must create a sufficient friction force between the belt 36, the pulley 31 and the roller 35, so that the belt 36 does not slip with respect to the pulley 31 or the roller 35.

Then, in order for the rotational force of the pulley 31 to be smoothly transmitted to the drive roller 4, the magnitude of the pressing force that the pulley 31 exerts on the drive roller 4, in the state where the data cartridge 1 is mounted must be great enough so that a suitably large friction force acts between the pulley 31 and the drive roller 4. At the same time, this pressing force of the pulley 31 with respect to the drive roller 4 must be directed so that it acts in a straight line linking the axial center C1 of the rotating shaft 33 of the pulley 31 and the axial center C2 of the drive roller 4.

The conventional tape transport mechanism 20 is configured so that these conditions are satisfied and the rotational force of the pulley 31 is efficiently transmitted to the drive roller 4.

More specifically, as shown in FIG. 8, in the state where the data cartridge 1 is mounted, the straight line linking the axial center C1 of the rotating shaft 33 of the pulley 31 and the axial center C2 of the drive roller 4, and the straight line linking the axial center C1 of the rotating shaft 33 of the pulley 31 and an axial center C3 of the rotating shaft 37 are substantially perpendicular. Because of this, the contact surface with the drive roller 4 is pressed by the pulley 3, in the direction of a straight line linking the axial center C1 and the axial center C2.

In addition, when the data cartridge 1 is not mounted, the pulley 31 does not contact the drive roller 4 even if it is urged by the spring force, so that it moves in the downwards direction. Then, when the pulley 31 has been urged downwards to the position indicated by the dotted line, the spring force that urged the pulley 31 downwards is balanced by the tension force of the belt 36 that pulls the pulley 31 in the direction of the roller 35. At this time, there is a distance l2 between the axial center C1 of the pulley 31, and the axial center C4 of the rotating shaft 34a of the drive motor 34. Moreover, the belt 36 is made of rubber that has a slight elasticity.

When the data cartridge 1 is mounted in the mounting portion 22, the drive roller 4 comes into contact with the pulley 31 and presses it in the upwards direction as shown in FIG. 8. When the mounting of the data cartridge 1 is completed, as shown by a solid line in FIG. 8, there is a distance l1 between the axial center C1 and the axial center C4. In this state, the belt 36 is contracted by a length that is substantially $2(l2-l1)$ shorter than that when the data cartridge 1 is not mounted. As a result, the tension force of the belt 36 that pulls the pulley 31 in the direction of the roller 35 is smaller than in the unmounted state.

The previously described spring force that urges the pulley 31 along the direction P2 is constant; as a result the pressing force of the pulley 31 with respect to the drive roller 4 acts in the direction P2. The magnitude of this pressing force is determined by the spring force of the spring that urges the support member 38 along with the pulley 31, and the tension force of the belt 36 with respect to the pulley 31. At the same time, the friction force of the belt 36 with respect to the pulley 31 and the roller 35 is also determined by the tensile force of the belt 36.

In the conventional tape transport mechanism 20, there is a suitable friction force of the belt 36 with respect to the pulley 31 and the roller 35, and the magnitude of the pressing force of the pulley 31 with respect to the drive roller 4 is set by the spring force of the spring, and the tensile force of the belt 36 is large enough to cause a suitable friction force between the pulley 31 and the drive roller 4.

As is commonly known, the tensile force of the belt 36 changes in magnitude when the length of the belt 36 changes. Accordingly, if the distance l1 between the axial center C1 and the axial center C4 is set to be small, then there will be a large change in the tensile force of the belt 36 if there is a change in the position of the pulley 31. Because of this, if the value for this distance l1 is small, it is difficult to set magnitudes for the spring force of the spring, and for the tensile force of the belt 36 so that the above conditions are satisfied. Therefore, with the conventional tape transport mechanism 20, the configuration is such that this distance l1 can be set so that it is, to a certain degree long, and so that the settings of the spring force of the spring and the tensile force of the belt 36 are facilitated.

However, when the distance l1 between the axial center C1 and the axial center C4 is long, then when the drive motor 34 is placed as shown in FIG. 8, it is difficult for the dimension in the direction of the width of the transport apparatus main unit 21 to be reduced. More specifically, the dimension W1 in the direction of the width of the transport apparatus main unit 21 is greater than the dimension (a+b) that is the sum of the dimension a of the portion of the drive motor 34 extending beyond a guide rail 22a, and a dimension b between the guide rails 22a and 22a.

Thus, when the drive motor 34 is positioned to the rear of the transport apparatus main unit 21 so that the width of the device can be reduced, there is a large change in the distance between the axial center C1 and the axial center C4 when there is a change in the position of the pulley 31, and so it is even more difficult to set the spring force of the spring and the tensile force of the belt 36.

SUMMARY OF THE INVENTION

The present invention has as a general object, the provision of a tape transport apparatus that has a reduced width, and in which a pulley and a pulley drive motor are provided to the same base and move together.

Another object of the present invention is to provide a tape transport apparatus including a mounting portion that mounts a cartridge having an externally driven roller, an information recording tape that runs in accordance with a rotational force of the roller, a single base provided to a side of the roller of the cartridge mounted on the mounting portion, a motor provided to the base, a pulley provided to the base and rotationally driven in accordance with rotation of the motor, and an urging means that urges the base so that the pulley is brought into contact with, and is pressed against the roller of the cartridge mounted in the mounting portion.

According to the present invention, the pulley is in contact with the drive roller and presses the drive roller with no change in the position relationship between the pulley and the motor when the base is urged to move. Accordingly, even if the base is provided on a rear portion of the tape transport apparatus on the side of the drive roller of the cartridge mounted in the mounting portion, it is easy for the rotational force of the motor to be smoothly transmitted to the pulley, and so it is possible to minimize the width of the transport apparatus main unit. In addition, by setting the force by which the urging means urges the base, it is possible to facilitate the setting of the pressing force of the pulley with respect to the drive roller and it is also possible for the rotational force of the pulley to be smoothly transmitted to the drive roller.

BRIEF DESCRIPTION OF THE DRAWINGS

FIG. 1 is a plan view of an embodiment of the tape transport apparatus of the present invention;

FIG. 3 is a sectional view along the section line III—III of FIG. 1;

DESCRIPTION OF THE PREFERRED EMBODIMENT

Figure 2:
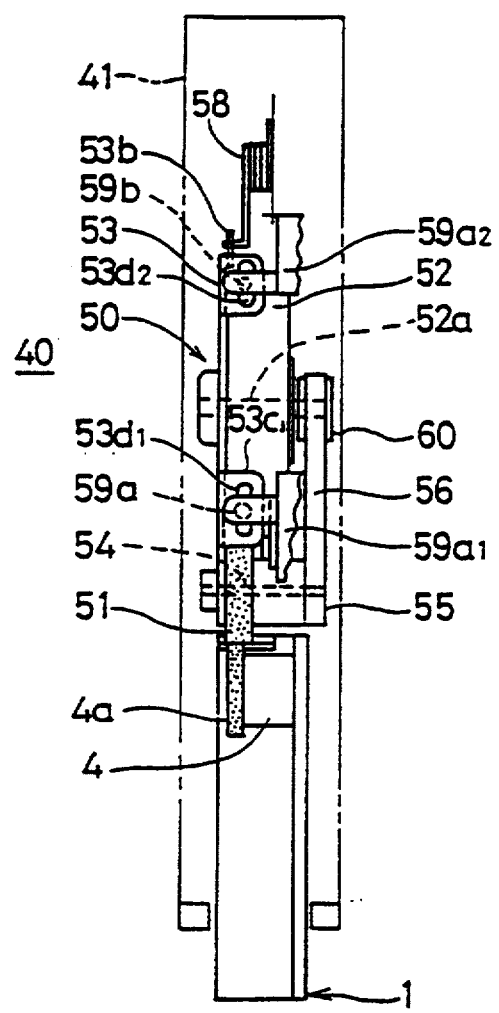
FIG. 2 is a longitudinal section view along the section line II—II of FIG. 1.
Figure 4:
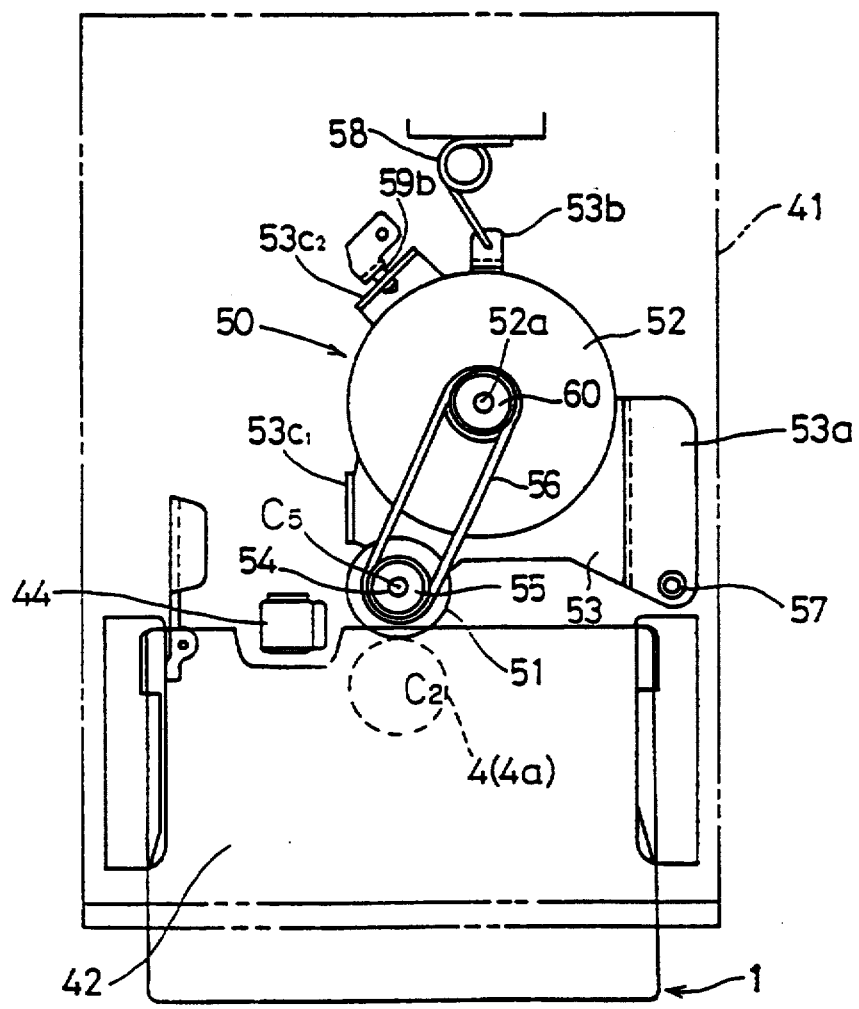
FIG. 4 is a bottom view of the tape transport apparatus of FIG. 1.
Figure 5:
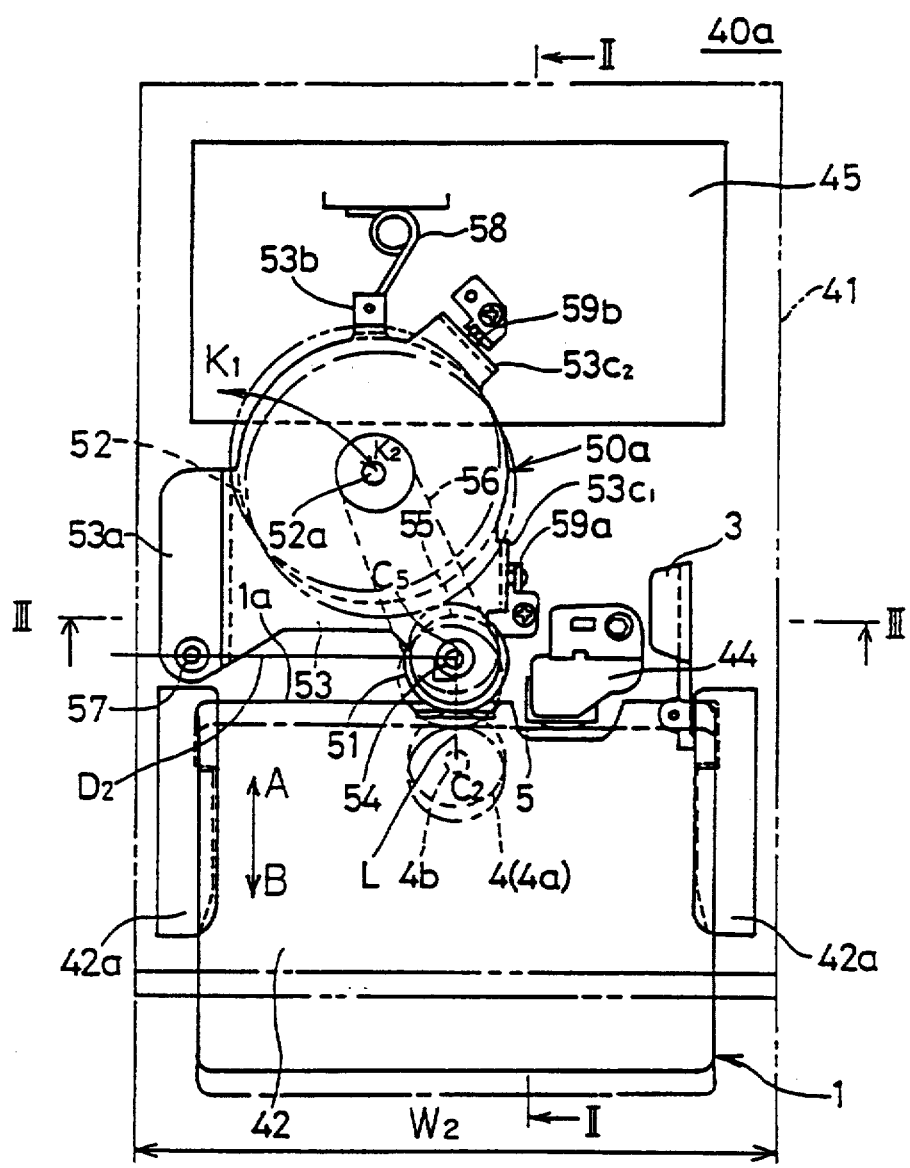
FIG. 5 is a plan view of another embodiment of the tape transport apparatus of the present invention.
Figure 6:
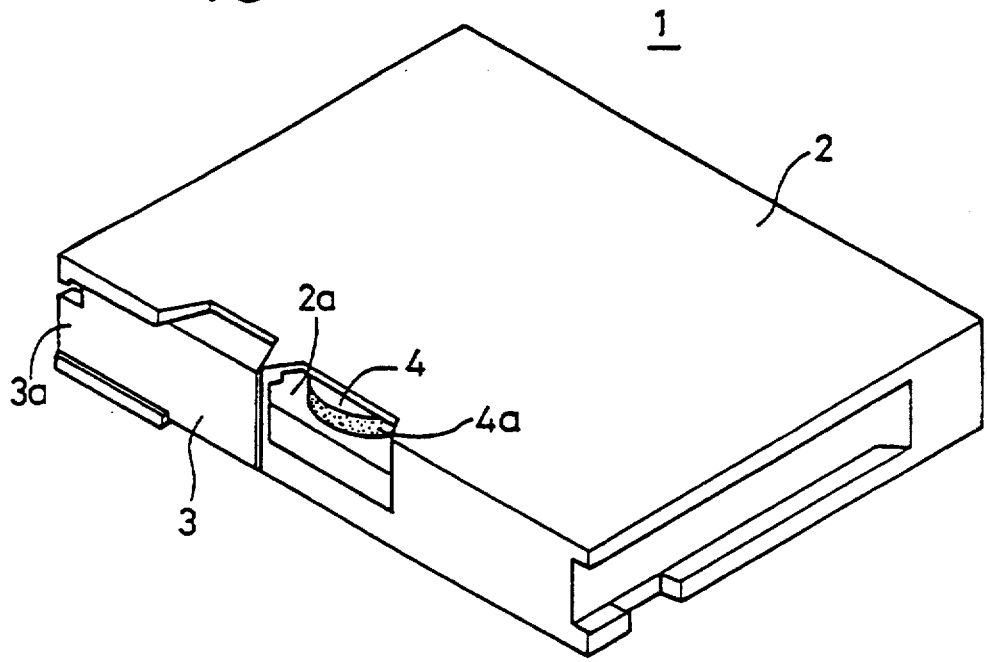
FIG. 6 is a perspective view showing an outer view of a data cartridge.
Figure 7:
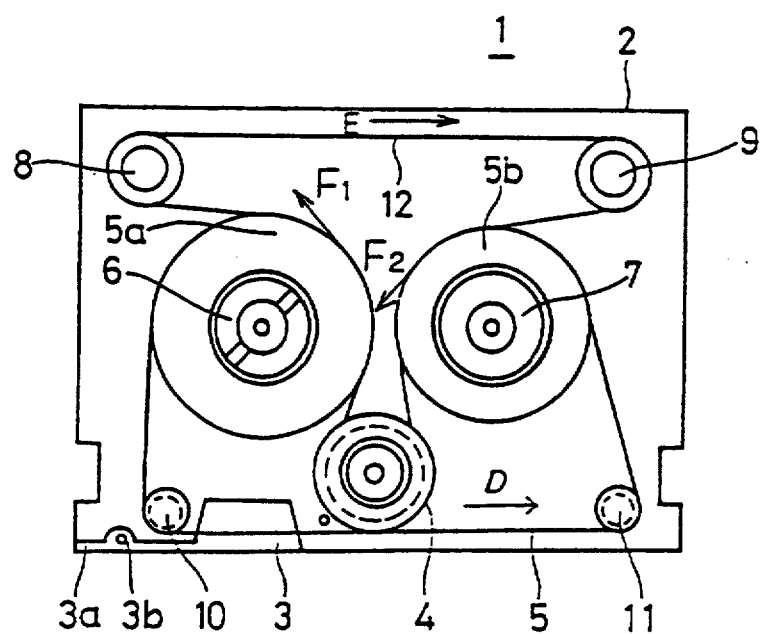
FIG. 7 is a plan view showing the internal configuration of a data cartridge.

FIG. 1 is a plan view of one embodiment of the tape transport apparatus of the present invention, FIG. 2 is a longitudinal section view along the section line II—II of FIG. 1, FIG. 3 is a sectional view along the section line III—III of FIG. 1 and FIG. 5 is a plan view of another embodiment of the tape transport apparatus of the present invention.

In each of the figures, a tape transport apparatus 40 is configured from a mounting portion 42, a drive unit 50, a magnetic head 44 and a circuit board 45 being provided inside a transport apparatus main unit 41.

In FIG. 1, the data cartridge 1 is inserted in the direction of the arrow A, from outside of the transport apparatus main unit 41 and mounted into the mounting portion 42. Rotational force from the drive unit 50 is transmitted to the drive roller 4 of the mounted data cartridge 1. The magnetic head 44 comes into contact with the magnetic tape 5 inside the data cartridge 1 and the information is recorded to and/or played back from the magnetic tape 5. Recording signals are supplied to the magnetic head 44 from the circuit board 45 and reproduction signals are output from the magnetic head 44 to the circuit board 45 and processed.

The following is a description of the configuration of the drive unit 50 which is a main portion of the present invention.

The drive unit 50 is configured from a pulley 51 and a drive motor 52 adjacently provided on a single moving base 53. The pulley 51 comes into contact with the drive roller 4 of the data cartridge 1 that is mounted in the mounting portion 42 and is rotationally driven by the rotational force of the drive motor 52 via a belt 56. As a result, the drive roller 4 of the data cartridge 1 rotates and the magnetic tape 5 inside the data cartridge 1 runs.

To the peripheral surface of the pulley 51 is provided a member of a material such as rubber, that has a high coefficient of friction. The pulley 51 is axially supported by a rotating shaft 54 so that it is freely rotatable. In FIG. 2, a roller 55 is provided to the bottom portion of the pulley 51 and is also axially supported by the rotating shaft 54. The rotating shaft 54 is provided so as to protrude from the moving base 53, to the right, as in FIG. 2.

The drive motor 52 is a thin, circular type of motor, and is mounted to the bottom surface of the moving base 53. The rotating shaft 52a of the drive motor 52 is provided so as to protrude from the case of the drive motor 52, to the right, as in FIG. 2. A roller 60 is inserted and fixed to the portion that protrudes from the rotating shaft 52a. The belt 56 is mounted on the roller 60 and the roller 55. The rotational force of the drive motor 52 is first transmitted to the roller 60, second to the belt 56, third to the roller 55 and then to the rotating shaft 54, and finally transmitted to the pulley 51.

On the left distal end portion of the moving base 53 in FIG. 1 is formed a support arm portion 53a. The lower distal end portion of the support arm portion 53a of FIG. 1 is supported by the rotating support shaft 57 provided to the transport apparatus main unit 41. Accordingly, the moving base 53 can rotate around the center of the rotating support shaft 57, in the direction shown by the arrows K1 and K2 in FIG. 1.

The moving base 53 is urged by a torsion spring 58 so that it rotates in the direction of the arrow K2. In addition, as shown in FIG. 2, the moving base 53 is provided so that the height of the pulley 51 is substantially the same as that of the drive roller 4 of the data cartridge 1 that is mounted in the mounting portion 42, and is provided so that the pulley 51 comes into contact with the peripheral surface 4a of the drive roller 4.

On the other hand, on the upper distal end portion of the moving base 53 in FIG. 1 is formed a finger portion 53b that protrudes from the moving base 53. One end of the torsion spring 58 is fixed to the finger portion 53b and the other end of the torsion spring 58 is fixed to the transport apparatus main unit 41.

The torsion spring 58 has an elastic force. One end of the torsion spring 58 is fixed to the finger portion 53b and the other end to the transport apparatus main unit 41. The torsion spring 58 is fixed to these members in an elastically deformed state. The moving base 53 is urged in the direction of the arrow K2 by the spring force (i.e. elastic force) of the torsion spring 58 so that it rotates in the direction of the arrow K2.

A vertical portion 53C1 is formed, close to the pulley 51, on the moving base 53 and a vertical portion 53C2 is also formed close to the finger portion 53b on the moving base 53. The distal end portion of the moving base 53 extends to the outer side of the moving base 53 and the extended end portion of the moving base 53 is bent so that it is perpendicular with respect to the surface of the moving base 53 in the direction of the lower surface of the moving base 53 on which the drive motor 52 is provided, and so as to form the vertical portions 53c1 and 53c2.

The weight of the drive motor 52 is applied to the moving base 53 and so when the moving base 53 rotates, a large friction force is generated at the contact area between the moving base 53 and other members. This friction force can be thought of as one reason why the moving base 53 does not rotate smoothly.

However, guide holes 53d1 and 53d2 are provided in the vertical portions 53c1 and 53c2 as in FIG. 2. These guide holes 53d1 and 53d2 are long holes that extended along a direction parallel to the surface of the moving base 53. As shown in FIG. 3, cylindrically shaped guide rollers 59a and 59b are inserted into the guide holes 53d1 and 53d2.

The guide rollers 59a and 59b are axially supported by support means 59a1 and 59a2 so that the direction of the height of the cylinder is substantially parallel to the surface of the moving base 53, and so that they are freely rotatable in the direction of the periphery of the cylinder. The support means 59a1 and 59a2 are fixed in the transport apparatus main unit 41.

When the weight of the drive motor 52 is applied to the moving base 53, the peripheral surfaces of the guide rollers 59a and 59b come into contact with the side portion of the guide holes 53d1 and 53d2. The guide rollers 59a and 59b are then driven when the moving base 53 rotates. Thence, the moving base 53 is guided so that it is parallel to the surface of the base and is smoothly rotated, thereby enabling the rotation operation of the moving base 53 to be performed stably.

The following is a description of the operation of the tape transport apparatus 40 described above.

On both sides of the mounting portion 42 of the tape transport apparatus 40 are provided guide rails 42a and 42a. The data cartridge 1 is inserted from outside the transport apparatus main unit 41, in the direction of the arrow A, is guided by the guide rails 42a and 42a, and is mounted to the mounting portion 42.

When the data cartridge 1 is being mounted in the mounting portion 42, the distal end portion 3a of the cover 3 of the data cartridge 1 is pressed by a mechanism not shown in FIG. 1. Then, the cover 3 rotates around the center of the support shaft 3b and opens as shown in FIG. 1. As a result, the magnetic tape 5 inside the data cartridge 1 is exposed to the outside of the data cartridge 1.

When the mounting of the data cartridge 1 into the mounting portion 42 is finished, the magnetic head 44 provided to the transport apparatus main unit 41 is brought into contact with the exposed magnetic tape 5. As a result, it is possible to record information on, and/or reproduced information from the magnetic tape 5.

The moving base 53 is always urged in the direction of the arrow K2 by the spring force of the torsion spring 58 so that it rotates in the direction of the arrow K2. The spring force of the torsion spring 58 lessens with rotation of the moving base 53 in the direction of the arrow K2. Accordingly, if the data cartridge 1 is not mounted in the mounting portion 42, then the rotation of the moving base 53 stops at the same time as the pulley 51 rotates in the direction of the arrow K2, to the position shown by the dotted line in FIG. 1.

Accordingly, when the data cartridge 1 is mounted in the mounting portion 42, and the data cartridge 1 is being inserted in the direction of the arrow A, then the drive roller 4 of the data cartridge 1 comes into contact with the pulley 51 and presses the pulley 51 in the direction of the arrow A, opposing the spring force of the torsion spring 58 that acts in the direction of the arrow K2. Then, the drive motor 52 does not rotate so the pulley 51 does not rotate.

Moreover, in the state where the mounting of the data cartridge 1 is finished and the drive roller 4 is in contact with the pulley 51, the position relationship between the flat surface of the drive roller 4 and the pulley 51 and the rotating support shaft 57 is set as described below.

The moving base 53 is urged so that it rotates in the direction shown by the arrow K2 and so the pulley 51 is brought into contact with the peripheral surface 4a of the drive roller 4 and it presses the drive roller 4 in the downwards direction, as shown in FIG. 1. At this time, the position relationship of the pulley 51 and the drive roller 4 is set so that the direction of the straight line L that links the axial center C2 of a rotating shaft 4b of the drive roller 4 and the axial center C5 of the rotating shaft 54 of the pulley 51 is in agreement with the mounting and demounting direction of the data cartridge 1 as shown by the arrows A–B.

The straight line D2 is a straight line that is perpendicular to the straight line L that passes through the axial center C5 of the rotating shaft 54. The rotating support shaft 57 of the moving base 53 is set so that it is positioned on this straight line D2. This arrangement satisfies, as has already been explained in "BACKGROUND OF THE INVENTION", one of the conditions for effective transmission of the rotational force of the drive motor 52 to the drive roller 4 via the pulley 51.

More specifically, when the pulley 51 comes into contact with the drive roller 4 and the moving base 53 is urged so that it rotates in the direction of the arrow K2, the pulley 51 presses the drive roller 4 in a direction perpendicular to the straight line D2. The reason for this is that the pressing force of the pulley 51 acts in a direction tangential to the arc of rotation of the axial center C5 of the rotating shaft 54. Accordingly, the pressing force of the pulley 51 with respect to the drive roller 4 acts along the straight line L.

When a magnetic tape 5 that has stopped is made to run again, the drive motor 52 rotates first; the rotational force of the drive motor 52 is transmitted to the pulley 51 via the belt 56. The pulley 51 is brought into contact with the drive roller 4 of the data cartridge 1 and presses it and so the rotational force of the pulley 51 is transmitted to the drive roller 4 so that the drive roller 4 is driven. Accordingly, the magnetic tape 5 is made to run by the drive mechanism inside the data cartridge 1.

In addition, when rotation of the drive motor 52 is stopped, rotation of the pulley 51 and the drive roller 4 also stops and so the running of the magnetic tape 5 stops.

The moving base 53 is urged in the direction of the arrow K2 by the spring force of the torsion spring 58. Accordingly, when the data cartridge 1 is ejected in the direction of the arrow B by the cartridge eject mechanism not shown in the figure, the moving base 53 rotates in the direction of the arrow K2 until the pulley 51 comes to the position it was prior to mounting of the data cartridge 1, as shown by the dotted line.

The pulley 51 and the drive motor 52 in the tape transport apparatus 40 of this embodiment are provided adjacent to each other on the single moving base 53. Accordingly, when the data cartridge 1 is being mounted, even if the pulley 51 is pressed against the drive roller 4 and moves, the drive motor 52 moves along with the moving base 53 and the pulley 51 so that there is no change in the position relationship between the pulley 51 and the drive motor 52.

Accordingly, there is also no change in the position relationship between the roller 55 and the roller 60. As a result, the tension force in the belt 56 mounted on the roller 55 and the roller 60 is always constant, and is held so regardless of where the moving base 53 is with respect to the transport apparatus main unit 41. In addition, the magnitude of the pressing force of the pulley 51 with respect to the drive roller 4 is determined in accordance with the spring force of the torsion spring 58. Accordingly, selection of the spring force of the torsion spring 58 enables the satisfaction of another condition for efficient transmission of the rotation force of the drive motor 52 to the pulley 51.

In this manner, the tensile force of the belt 56 has no influence on the magnitude of the pressing force of the pulley 51 with respect to the drive roller 4, and accordingly, the tensile force of the belt 56 can be set to a tensile force so that there is a suitable frictional force without slippage of the belt 56 with respect to the rollers 55 and 60. This arrangement satisfies, still another condition for efficient transmission of the rotation force of the drive motor 52 to the pulley 51.

Figure 8:
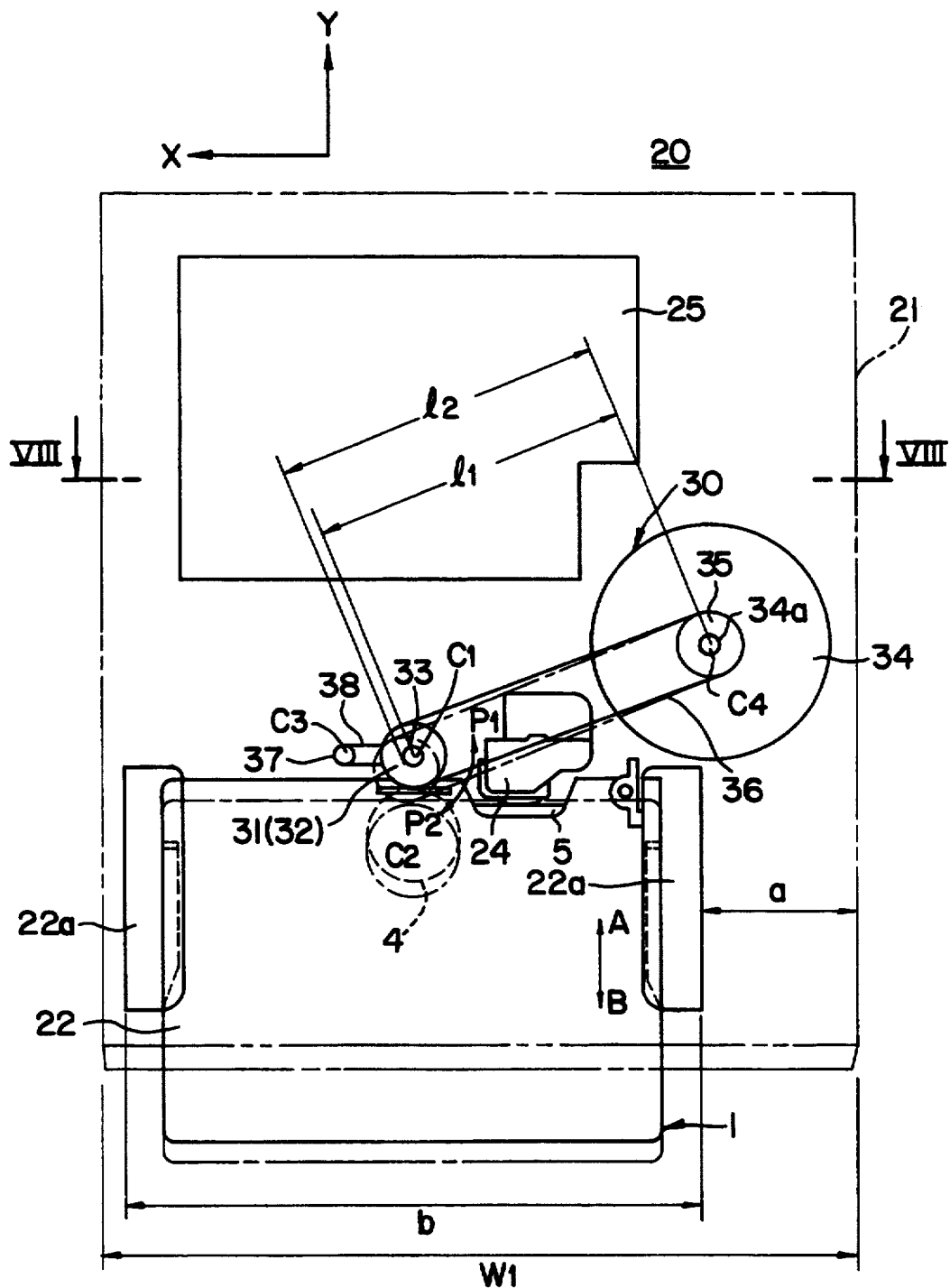
FIG. 8 is a plan view that shows one example of a conventional tape transport apparatus.
Figure 9:
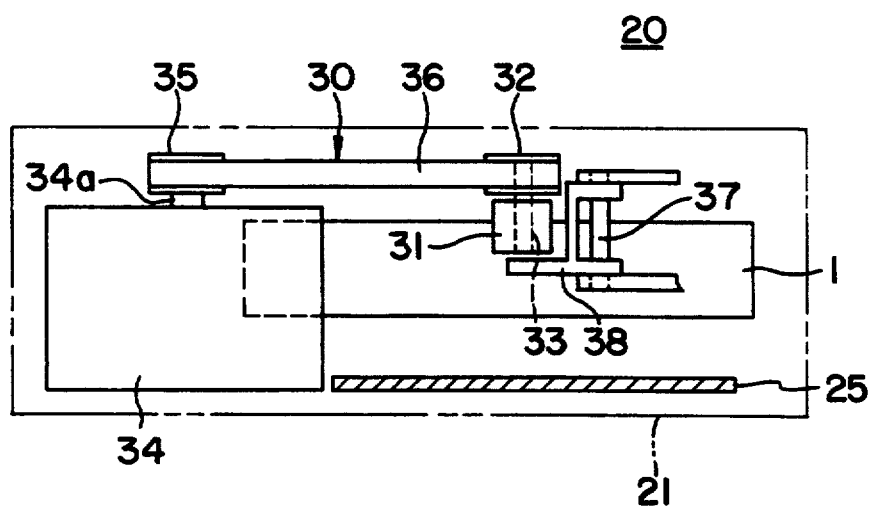
FIG. 9 is a sectional view along the section line VIII—VIII of FIG. 8.

As there is no change in the position relationship between the roller 55 and the roller 60, it is possible for the tension force in the belt 56 to be constant irrespective of the length of the belt 56. Accordingly, it is possible to set the belt 56 so that it is shorter than a conventional belt 36 (shown in FIG. 8 and FIG. 9), so that the distance between the shafts of the drive motor 52 and the pulley 56 is shortened, thereby making it possible for the transport apparatus main unit 41 to be made more compact.

Accordingly, as shown in FIG. 1, it is possible to arrange the moving base 53 having a belt 56 and a drive motor 52 in the portion to the rear of the transport apparatus main unit 41, opposite the side to which the drive roller 4 of the mounted data cartridge 1 is provided. As a result, unlike in the conventional transport apparatus main unit 21 (shown in FIG. 8 and FIG. 9) it is possible to prevent the drive motor 34 from extending in the direction of the width of the transport apparatus main unit 21 beyond the guide rail 22a.

Moreover, the drive motor 52 is a thin type motor and so it is possible to provide the circuit board 45 underneath the drive motor 52.

As a result, in the transport apparatus main unit 41 of the present embodiment, it is not necessary to have, as in the case of the conventional transport apparatus main unit 21, the length a (shown in FIG. 8) of the portion that the drive motor 34 extend beyond the guide rail 22a in the direction of the width of the transport apparatus main unit 21. Consequently, the dimension W2, in the direction of the width of the transport apparatus main unit 41, can be made slightly larger than the dimension between the guide rails 42a and 42a. In this manner, according to the tape transport apparatus 40 of the present embodiment, it is easy for the rotational force of the drive motor 52 to be transmitted to the drive roller 4, and it is possible to make the dimension W2 in the direction of the width of the transport apparatus main unit 41 in FIG. 1 much smaller than the dimension W1 in the direction of the width of the conventional transport apparatus main unit 21 in FIG. 8.

FIG. 5 is a plan view of another embodiment of the tape transport apparatus of the present invention. In the FIG. 5, those portions that correspond to portions in FIG. 1 through FIG. 4 are indicated with corresponding numerals, and the corresponding descriptions of them are omitted.

In FIG. 5, a tape transport apparatus 40a is configured with a mounting portion 42, a drive unit 50a, a magnetic head 44 and a circuit board 45 provided inside a transport apparatus main unit 41. In the same manner as the drive unit 50 and the tape transport apparatus 40 in the embodiment described above, the drive unit 50a is configured from the pulley 51 and the drive motor 52 provided adjacent to each other on the single moving base 53. The moving base 53 is configured so as to be rotatable around the center of rotation of the rotating support shaft 57.

In addition, the mechanism that transmits the rotational force of the drive motor 52 to the pulley 51 is also configured by a belt drive in the same manner as the drive unit 50. In addition, the position relationship, on the flat plan, of the rotating support shaft 57, the pulley 51 and the drive roller 4 is also set in the same manner as in the embodiment described above. Furthermore, the guide rollers 59a and 59b are inserted into the guide holes 53d1 and 53d2 to guide the moving base 53 so that it rotates smoothly.

The following is a description of the differences between the configuration of the drive unit 50a which is a main portion of this embodiment, and the drive unit 50 of the embodiment described above.

In the same manner as in the drive unit 50 for the embodiment described above, one end of the torsion spring 58 is fixed to the finger portion 53b of the moving base 53 and the other end of the torsion spring 58 is set and fixed to the transport apparatus main unit 41. The moving base 53 is urged by the spring force of the torsion spring 58 in the direction shown by the arrow K2. However an actuator, not shown in the figure, is provided to the moving base 53. When this actuator operates to urge the moving base 53 in the direction of the arrow K1, the moving base 53 rotates in the direction shown by the arrow K1 so as to oppose the spring force of the torsion spring 58 which acts in the direction K2.

The following is a description of the operation of the tape transport apparatus 40a described above.

When the electric power is not applied to the tape transport apparatus, and when the data cartridge 1 is not mounted in the mounting portion 42, the actuator does not operate and the moving base 53 is urged in the direction of the arrow K2 by the spring force of the torsion spring 58. Accordingly, the moving base 53 rotates in the direction K2 until the pulley 51 comes to the position shown by the dotted line. At this time rotation of the moving base 53 in the direction of the arrow K2 stops since the spring force of the torsion spring 58 has become weaker.

The data cartridge 1 is mounted in the mounting portion 42 so as to oppose the spring force of the torsion spring 58 that urges the moving base 53 in the direction shown by the arrow K2. The drive roller 4 of the mounted data cartridge 1 is in contact with the pulley 51 at the position described above.

When the mounting of the data cartridge 1 is completed, the actuator not shown in the figure operates, rotating the moving base 53 in the direction of the arrow K1 so as to oppose the spring force of the torsion spring 58. Accordingly, the pulley 51 is separated from the peripheral surface 4a of the drive roller 4 as shown by the double-dotted line. As a result, the drive roller 4 of the data cartridge 1 does not rotate and so the magnetic tape 5 does not run. Moreover, the drive motor 52 does not rotate at this time and the pulley 51 also does not rotate.

Then, when the stopped magnetic tape 5 is made to run, the operation of the actuator stops, the moving base 53 is urged in the direction K2 by the spring force of the torsion spring 58, and the actuator rotates about the center of the rotating support shaft 57. At the same time, the rotation of the drive motor 52 starts and the rotational force of the rotating support shaft 57 is transmitted to the pulley 51 via the belt 56. Then, the rotation of the moving base 53 in the direction K2 causes the rotating pulley 51 to come into contact with the peripheral surface 4a of the drive roller 4 and to press against the drive roller 4. At this time, the magnitude of the pressing force of the pulley 51 with respect to the drive roller 4 is set by the spring force of the torsion spring 58 in the same manner as for the embodiment described above.

As a result, the rotational force of the drive motor 52 is efficiently transmitted to the drive roller 4 via the pulley 51, the roller 55 and the belt 56 inside the drive unit 50a. Accordingly, the drive roller 4 rotates smoothly, and the magnetic tape 5 is made to run by the drive mechanism inside the data cartridge 1.

When the running magnetic tape 5 is stopped, the tape transport apparatus 40a operates in the reverse manner to that described above.

More specifically, the actuator operates first and the moving base 53 is made to rotate in the direction of the arrow K1 so as to oppose the spring force of the torsion spring 58 in the direction of the arrow K2. As a result, the pulley 51 is separated from the peripheral surface 4a of the drive roller 4 so that the rotational force of the drive motor 52 is not transmitted to the drive roller 4. Then the rotation of the drive roller 4 stops, and so the running of the magnetic tape 5 also stops. At the same time, the rotation of the drive motor 52 also stops.

In the tape transport apparatus 40a of the present embodiment the pulley 51, and the drive motor 52 that drives the pulley 51 via the belt 56, are provided on the moving base 53. The effect of this is the same as that for the embodiment described above.

In each of the embodiments described above, the moving base 53 rotates around the center of rotation of the rotating support shaft 57, the pulley 51 on the moving base 53 comes into contact with the drive roller 4 of the data cartridge 1, and the drive roller 4 is pressed. However, if, for example linear, reciprocating action of the moving base 53 along the straight line L causes the pulley 51 on the moving base 53 to come into contact with the drive roller 4 of the data cartridge 1 and press the drive roller 4, an effect that is the same as that of each of the embodiments described above can still be obtained.

In each of the embodiments described above, the rotating support shaft 57 of the moving base 53 was accurately provided on the straight line D2. However, even if the rotating support shaft 57 is arranged slightly off the straight line D2, the rotational force of the drive motor 52 is still efficiently transmitted to the drive roller 4.

The present invention is not limited to the aforementioned embodiments, and variations and modifications may be made without departing from the scope of the claimed invention.

What is claimed is:

1. A tape transport apparatus comprising:
   a mounting portion adapted to mount a cartridge having an externally driven roller and a recording tape running inside said cartridge in accordance with rotation of said roller around its rotational center, said mounting portion being fixed to a stationary main unit of said apparatus;
   a pulley for rotating said roller of said cartridge in accordance with rotation of said pulley around its rotational center, said pulley adapted to come into contact with said roller via said recording tape;
   a motor for rotating said pulley via a belt, said motor having a drive shaft engaged with said belt, said belt passing around said pulley and around said drive shaft of said motor;
   base means for mounting said pulley and said motor on said base means, said base means being movable on said main unit of said apparatus such that said pulley is located adjacent to said roller when said cartridge is mounted to said mounting portion; and
   urging means for urging said base means such that said pulley mounted on said base means presses said roller of said cartridge so that said pulley mounted on said base means is brought into contact with said roller of said cartridge mounted to said mounting portion.

2. An apparatus according to claim 1, wherein said urging means urges said base means so that said pulley mounted on said base presses said roller along a first straight line linking a rotational center of said roller and a rotational center of said pulley when said pulley comes into contact with said roller of said cartridge mounted to said mounting portion, said first straight line being substantially perpendicular to said recording tape of said cartridge.

3. An apparatus according to claim 2, wherein said base has a rotatable shaft at which said base means is pivotably supported on said main unit of said apparatus, said base being urged by said urging means to pivot about said rotatable shaft.

4. An apparatus according to claim 1, wherein said motor is mounted on said base such that said drive shaft of said motor is substantially perpendicular to a mounting surface of said base means on which said pulley and said motor are mounted.

5. An apparatus according to claim 1, wherein said base has a set of guide members for guiding said base means such that said base is urged to move in a direction substantially parallel to a mounting surface of said base on which said pulley and said motor are mounted, said guide members being fixed to said main unit of said apparatus.

6. An apparatus according to claim 5, wherein said base means has vertical wall portions each of which has an elongated opening at a position corresponding to each of said guide members, said elongated opening extending in a direction substantially parallel to said mounting surface of said base means.

7. An apparatus according to claim 5, wherein each of said guide members has a substantially cylindrical portion, said cylindrical portion being brought into contact with a side surface of each said opening of said base means, and said cylindrical portion being rotated when said base means is moved by said urging means.

8. An apparatus according to claim 1, wherein said urging means is a torsion spring, one end of said torsion spring being fixed to a portion of said base means, and the other end of said torsion spring being fixed to said main unit of the apparatus.

9. An apparatus according to claim 1, wherein said base means is movable on said main unit in a direction in which said cartridge is inserted to or ejected from said apparatus.

* * * * *